H. C. BELL.
Improvement in Churns.

No. 129,918.

Patented July 30, 1872.

Witnesses:
E. Wolff.
W. A. Graham

Inventor:
Henry C. Bell.
Per
Attorneys.

UNITED STATES PATENT OFFICE.

HENRY C. BELL, OF EDINA, MISSOURI.

IMPROVEMENT IN CHURNS.

Specification forming part of Letters Patent No. 129,918, dated July 30, 1872.

Specification describing a new and useful Improvement in Churning Apparatus, invented by HENRY C. BELL, of Edina, in the county of Knox and State of Missouri.

Figure 1:
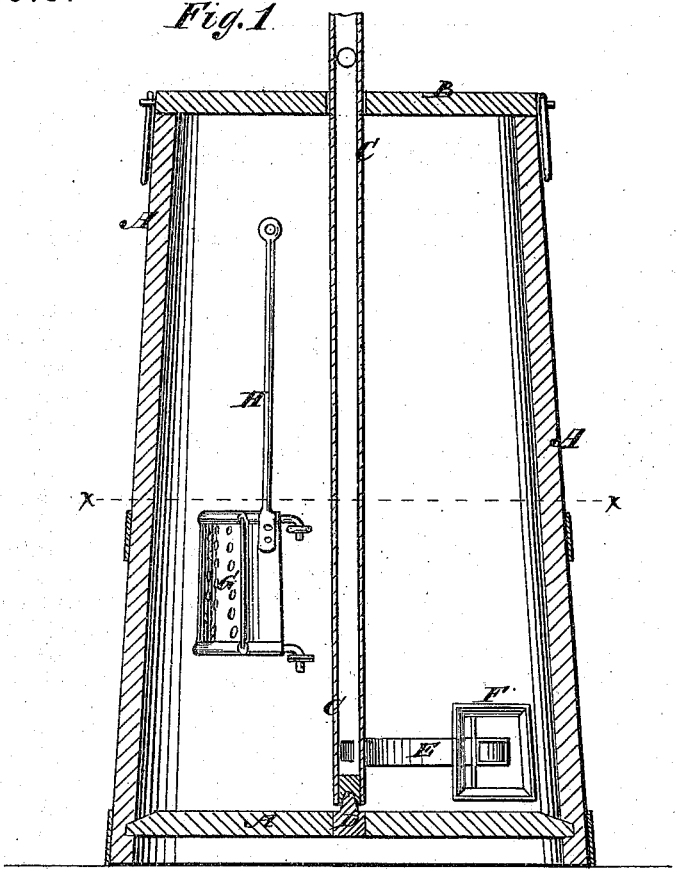
Figure 2:
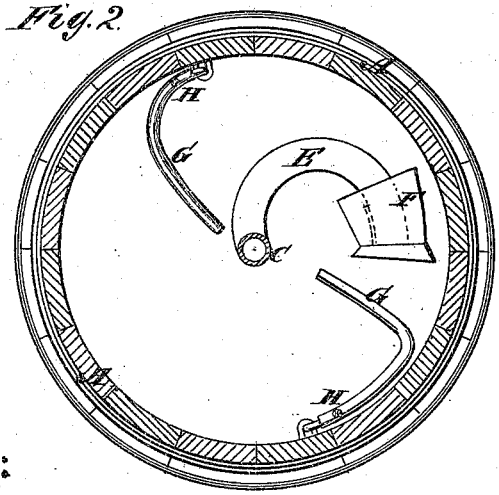

Figure 1 is a detail vertical section of a churn, illustrating my invention. Fig. 2 is a detail horizontal section of the same taken through the line $x$ $x$, Fig. 1.

Similar letters of reference indicate corresponding parts.

My invention has for its object to furnish an improved churning apparatus, for attachment to ordinary churns, which shall be so constructed and arranged as to bring the butter quickly and with little expenditure of labor; and it consists in the construction and combination of various parts of the device, as hereinafter more fully described.

A represents the body of the churn, which is provided with a cover, B, in the ordinary manner, and about the construction of which there is nothing new. C is the dasher-handle, which is made hollow and is closed at its lower end by a hard-wood plug, which is recessed or concaved at its lower end to receive the pivot D inserted in or attached to the center of the bottom of the churn-body A. To the side of the lower part of the tubular handle C is attached the end of a curved pipe, E, which may be round or square, and which communicates with the interior of the said tubular handle C through a hole in its side. The pipe E is curved in the form of a semicircle, and its outer end is projected a little beyond the end of the semicircle, the projecting part being an arc of a circle having its center at the other end of said pipe E. To the rear or free end of the pipe E is attached a hood, F, which is made hopper-shaped, is attached to the end of the pipe E by one or more cross-bars, and is arranged with its smaller end toward the end of the pipe E. The rear part of the hood F, that projects in the rear of the end of the pipe E, is made flaring, as shown in Fig. 2, to give a free discharge to said hood. By this construction, as the tubular handle C is revolved rapidly, the rear end of the pipe E and the hood F are carried rapidly through the milk, the form of the hood F increasing the force of the current past the end of the pipe E, causing a vacuum, and thus drawing the air through the handle C and pipe E and discharging it into the milk, and causing, in connection with the currents formed by the movement of the pipe E and hood F, a violent agitation in the milk. G are current-breakers, one or more of which may be used, according to the size of the churn, and which may be made of perforated sheet metal or wire-gauze. The current-breakers G may be curved or bent at an angle and have hooks formed upon their edges to hook into staples or eyes attached to the sides of the churn-body A, in such positions that the lower edge of the breakers G may be a little above the path of the pipe E and hood F, so as to receive and break up the currents formed by the movement of the said pipe and hood, thus bringing the butter very thoroughly and in a very short time. The current-breakers G are provided with rods or handles H, by means of which they may be conveniently attached and detached, as desired.

The dasher is designed to be operated by gearing connected with the upper end of the handle C.

Having thus described my invention, I claim as new and desire to secure by Letters Patent—

1. The tubular handle C, curved pipe E, and hood F, constructed and operated in connection with a churn-body, A, substantially as herein shown and described, and for the purpose set forth.

2. The detachable current-breakers G, in combination with the tubular handle C, curved pipe E, hood F, and churn-body A, substantially as herein shown and described, and for the purpose set forth.

HENRY C. BELL.

Witnesses:
BENJAMIN BOWEN,
PHILIP B. LINVILLE.